Patented Mar. 24, 1942

2,277,359

UNITED STATES PATENT OFFICE 2,277,359

PROCESS OF PERFORMING ORGANIC CHEMICAL REACTIONS WITH ALKALI METAL COMPOUNDS

Erik Schirm, Dessau, Anhalt, Richard Hueter, Dessau-Rosslau, Anhalt, and Heinz-Joachim Engelbrecht, Dessau, Anhalt, Germany, assignors, by mesne assignments, to "Patchem A.-G. zur Beteiligung an Patenten und Sonstigen Erfindungsrechten auf Chemische Verfahren," Zurich, Switzerland, a corporation of Switzerland No Drawing. Application December 16, 1938, Serial No. 246,070. In Germany December 18, 1937

11 Claims. (Cl. 260—132)

We known that by the catalytic high-pressure hydrogenation of furfurol we obtain as principal alcoholic reaction products tetra-hydro-furfuryl-alcohol, 1,2- and 1,5-pentandiol and small portions of low mono-valent alcohols.

Now, as a result of extended researches, it has been found that in the presence of these hydrogenation-products a great number of chemical conversions can advantageously be performed. It is a fact that in spite of the numerous solvents available for the performing of organic-chemical reactions we hitherto have not had a suitable medium combining a comparatively low volatility with a high dissolving power, particularly when the reactions involved alkali metal and alkali metal compounds. In such reactions we usually used methanol, ethanol, butanol or the like as solvents, but these agents proved too volatile. In performing chemical conversions in their presence we generally were forced to use an autoclave, i. e., we had to choose a way which is not advantageous. On the other hand, the alcoholic hydrogenation-products of furfurol, which have at least equal, and in most cases, even better dissolving power than the foregoing alcohols, have such low volatility that chemical conversions can be performed in their presence in an open vessel at temperatures up to 240° C. This means an extraordinary simplification in many commercial processes.

Compared with cyclohexanol and its homologues, which have a higher boiling-point and also are frequently used to assist the above-mentioned conversions, the hydrogenation-products of furfurol show a surprisingly high dissolving power for alkali metal compounds very often used for such reactions such as alkali metal hydroxides, alkali metal halogenides, alkali metal sulfides, alkali metal polysulfides, alkali metal sulfohydrates, alkali metal rhodanides, alkali metal enolates, alkali metal alcoholates, alkali metal phenolates, alkali metal naphtholates, etc., and also for high molecular organic compounds. Thus these higher molecular compounds can be converted with the aforementioned alkali metal compounds in a particularly smooth reaction previously not attainable, and also in a very satisfactory yield. The miscibility of the hydrogenation-products of furfurol with water facilitates in many cases the extraction of the reaction products as well as the separation of the reaction products from water-soluble media and by-products. This property constituted an additional element of superiority over the aforesaid well-known solvents.

Among these conversions, the numerous conversions of the alkali metal sulfides, -polysulfides and -sulfohydrates with organic compounds containing replaceable halogen-atoms, or nitro-groups, and with the well-known initial compounds used for the production of sulfur dyes for use in dyeing operations are all of great commercial significance. Conversions of this kind can be performed according to the present method under much more favourable conditions and with higher outputs of purer products than hitherto possible with any other known method.

Other solvents and diluents, in addition to the hydrogenation-products of furfurol considered herein, may be jointly employed, such as low fatty alcohols, cyclohexanol, methyl-cyclohexanol, chlorohydrocarbons, di-oxane, benzol-hydrocarbons, phenols and the like.

*Example 1*

Forty-four parts by weight of sodium-hydroxide are dissolved, while warming, in 500 parts by weight of the raw furfurol-hydrogenation-product, having a boiling point varying between 90 and 240° C. Then 48 parts by weight of spermaceti are added whereupon the mixture is heated for 2 hours up to 160° C. Now first the solvent and then the cetyl-alcohol are distilled off under greatly reduced pressure. There remains as a residue sodium palmitate which forms a clear solution in hot water. Both of the split-products of the spermaceti are produced in the theoretical yields.

*Example 2*

One hundred forty-eight and five-tenths parts by weight of n-octyl chloride, 183 of finely pulverized potassium-iodide and 500 of a mixture of 1,2- and 1,5-pentandiol, forming the highest-boiling portion of the furfurol-hydrogenation-product, are stirred for 3 to 4 hours at 130 to 135° C. The octyl-chloride, which at the beginning was floating over the solvent, then disappears and a homogeneous brownish liquid with crystal-powder suspended in it is developed. After cooling, the reaction mass is shaken or stirred with 2500 parts by weight of water in order to eliminate the inorganic salts and the greater chief proportion of the pentandiols. The heavy oil separated off is washed several times with cold water and then subjected to a careful fractional distillation under reduced pressure. The yield of the thus resulting n-octyl-iodide is very satisfactory.

Example 3

One hundred and fifty-six parts by weight of commercial sodium sulfide (with 60% of $Na_2S$) are dissolved, while warming in 800 parts by weight of tetra-hydrofurfuryl-alcohol. The solution, freed of iron-sulfide by filtering, is saturated at 50 to 55° C. with carbon-dioxide, whereupon 289 parts by weight of octadecyl-chloride are added and then the mass is heated at 60–65° C. for 8 hours while stirring. Now 800 parts by weight of warm water are added, the aqueous layer drawn off and the oil washed with hot water until the alkaline reaction ceases. Then the water in the reaction mass is distilled off under reduced pressure. Two hundred and thirty-five parts by weight of octadecyl-mercaptan which equals 82% of the theoretical yield are obtained.

Example 4

One hundred and fifty-eight parts by weight of p-chloro-nitrobenzol are dissolved, while slightly warming, in 250 parts by weight of tetrahydro-furfuryl-alcohol. Then a warm solution of 98 parts by weight of commercial sodium sulfide (with 60% of $Na_2S$) freed from iron-sulfide by filtering, and 24 parts by weight of sulfur in 750 parts by weight of tetrahydro-furfuryl-alcohol are gradually added. Now the reaction-mixture is stirred for 2 hours at 90 to 95° C., diluted with 1000 parts by weight of water; cooled, and then the precipitate is filtered off. As a result 138.6 parts by weight of raw p,p'-dinitro-diphenyl-disulfide are obtained which is dried at 95° C. and equals 90% of the theoretical yield.

Example 5

Forty-one parts by weight of n-dodecyl chloride, 23 of potassium rhodanide and 200 of a fraction of the hydrogenation-product from the furfurol-hydrogenation, separated from its low boiling fraction and boiling between 150 and 240° C., are stirred at 150 to 160° C. until the separation of sodium-chloride is completed. The reaction-mixture, cooled down a little, then liberated from sodium-chloride by filtering and the filtrate is subjected to fractional distillation in vacuo. During this operation the solvent passes over first and then the n-dodecyl-rhodanide is obtained in a very remarkable yield.

Example 6

Two hundred and sixty parts by weight of commercial sodium-sulfide (with 60% of $Na_2S$) are dissolved in 3000 parts by weight of warm tetrahydro-furfuryl alcohol. After filtering off the iron sulfide, 706 parts by weight of m-nitro-benzaldehyde - dioctadecyl - mercaptol (produced according to the U. S. A. patent application Ser. No. 205,989) are stirred into this solution within half an hour at 60 to 65° C. Then the stirring is continued for 2½ hours at 80 to 85° C., whereupon it is cooled down to 15° C. and the separation-product quickly separated by suction filtration and pressed. The residue is freed from the unseparated salts and the colouring impurities by repeated washings with hot water and then dried. The yield of m-amino-benzaldehyde-di-octadecyl-mercaptol, a grey-yellowish powder growing nearly colourless after re-crystallizing from methyl-cyclohexane and having a flash-point of 65 to 66° C., is 610 parts by weight and equals 90% of the theoretical yield.

Example 7

Three hundred and fifty parts by weight of commercial sodium sulfide (with 60% of $Na_2S$) and 345 weight parts of sulfur are dissolved in 3000 parts by weight of tetrahydro-furfuryl-alcohol. Then 276 parts by weight of p-phenylamino-p'-hydroxy-diphenylamine are added and the mixture so stirred for 24 hours at 100° C. Now the diluent is distilled off under reduced pressure and the residue dissolved in water. After filtering, the blue dye-stuff is precipitated from the solution by blowing air into it.

Example 8

To a solution of 11.5 parts by weight of metallic sodium in 250 parts by weight of tetrahydro-furfuryl-alcohol, 40 parts by weight of malonic ester are added at approximately 8° C. Immediately thereafter 160 parts by weight of octadecyl-chloride and 1.6 parts by weight of potassium-iodide are added. The reaction-mixture is heated, while stirring, to 100° C. and retained thereat until the solution is neutral. After separating off the precipitated sodium chloride and after distilling off the tetrahydrofurfuryl-alcohol the alkylated malonic ester is saponified; the potassium-salt is converted into the calcium-salt and the latter is then purified by extraction with ether and alcohol. By acidulating we obtain the free acid which, after purifying by fractional crystallization from methanol shows a melting point of 86 to 87° C. and an acid-number of 184.5.

Example 9

A solution of 11.5 parts by weight of metallic sodium in 250 parts by weight of tetrahydrofurfuryl-alcohol is warmed with 70 parts by weight of benzyl-chloride up to 40–50° C., until the solution is neutral. After separating the precipitated sodium-chloride the solution is distilled in vacuo. The benzyl-ether of the tetra-hydrofurfuryl-alcohol begins to boil between 134 and 135° C. at a pressure of 9 millimeters. The excess tetrahydrofurfuryl-alcohol is nearly quantitatively recovered by distillation. Eighty per cent of the theoretical yield is obtained.

Example 10

To a solution of 1.4 parts by weight of metallic sodium in 30 parts by weight of tetrahydro-furfuryl-alcohol 8.5 parts by weight of p-nitro-phenol, are stirred in at 100° C. Then 18 parts by weight of octadecyl-chloride are slowly added at approximately 140° C. and finally 0.18 part by weight of potassium-iodide are added, whereupon stirring is continued until a sample shows a neutral reaction. After cooling the crystallized octadecyl-p-nitro-phenol-ether is separated from tetrahydro-furfuryl-alcohol by suction filtration, then washed with water to get it free from sodium-chloride and finally dried. The reaction product is obtained in a quantity which equals 93% of the theoretical yield and has a melting point of 70 to 71° C.

We claim:

1. In a process for producing an organic reaction product of an alkali metal compound difficulty soluble in organic solvents and an organic compound, the improvement which comprises dissolving the alkali metal compound in an alcoholic hydrogenation product of furfurol and carrying out the reaction of said alkali metal compound with said organic compound in the presence of said alcoholic hydrogenation product as a solvent for the reagents.

2. In the production of organic reaction products involving reacting an alkali metal compound with an organic compound, the improvement which comprises dissolving the reagents in the alcoholic hydrogenation products of furfurol and performing the reaction in the presence of said alcoholic hydrogenation products in an open vessel at temperatures less than 240° C.

3. In the production of organic reaction products involving reacting an organic compound with an alkali metal compound selected from the group consisting of alkali metals, alkali metal hydroxides, alkali metal sulfides, alkali metal polysulfides and alkali metal hydrosulfides, the improvement which comprises performing the reaction in the presence of an alcoholic hydrogenation product of furfurol.

4. In the reaction of an organic halide with an alkali metal compound, the improvement which comprises performing the reaction in the presence of an alcoholic hydrogenation product of furfurol.

5. In the reaction of an organic nitro-compound with an alkali metal compound, the improvement which comprises performing the reaction in the presence of an alcoholic hydrogenation product of furfurol.

6. In the production of sulfur dyes involving the reaction of a sulfur alkali metal compound with an organic nitrogen compound which produces sulfur dyes upon reaction with said alkali metal compound, the improvement which comprises performing the reaction in the presence of an alcoholic hydrogenation product of furfurol.

7. In the reaction of an aliphatic halide with an alkali metal compound, the improvement which comprises reacting said compound in the presence of an alcoholic hydrogenation product of furfurol.

8. In a process for producing an organic reaction product of an inorganic alkali metal compound with an organic compound, the improvement which comprises dissolving said inorganic alkali metal compound in tetrahydrofurfurol alcohol and carrying out the reaction of said alkali metal compound with said organic compound in the presence of said tertahydrofurfurol alcohol as the solvent.

9. In a process for producing an organic reaction product, the improvement which comprises reacting an organic halide with an alkali metal compound in the presence of pentandiol as the solvent.

10. In a process for producing an organic reaction product of an alkali metal sulfide with an organic compound, the improvement which comprises carrying out the reaction in the presence of tetrahydrofurfurol alcohol as the solvent.

11. In the process of producing an organic reaction product of an alkali metal compound difficultly soluble in organic solvents, the improvement which comprises reacting said alkali metal compound with a reactive organic compound in the presence of an alcoholic hydrogenation product of furfurol as a dissolving agent.

ERIK SCHIRM.
RICHARD HUETER.
HEINZ-JOACHIM ENGELBRECHT.